ILLUMINATING FLARE COMPOSITION COMPOSED OF MAGNESIUM, SODIUM NITRATE, AND AN EPOXY RESIN-POLYGLYCOL RESIN BINDER

Bernard E. Douda, Bloomfield, Ind., assignor to the United States of America as represented by the Secretary of the Navy
No Drawing. Filed July 31, 1967, Ser. No. 657,726
1 Claim. (Cl. 149—19)

ABSTRACT OF THE DISCLOSURE

An illuminating flare composition comprised of a fuel, such as magnesium, an oxidizing agent, such as sodium nitrate, and a binder comprised of an epoxy resin and a polyglycol resin.

The invention described herein may be manufactured and used by or for the Government of the United States of America for governmental purposes without the payment of any royalties thereon or therefor.

BACKGROUND OF THE INVENTION

The present invention relates to a consumable pyrotechnic device, that is, an illuminating flare, and particularly to a flare which is to have military application, such as one to be dropped from an aircraft by parachute.

Various binders are known in the art for use in illuminating flares with the binders serving as a cohering agent for the oxidizing and light or color producing ingredients. For example, U.S. Patent 2,841,481, which issued July 1, 1958, to Ronald G. Hall, discloses a pyrotechnic composition utilizing phenol-formaldehyde resin, a ureaformaldehyde resin, or a melamine-formaldehyde resin as a binding agent.

In U.S. Patent 2,984,558, which issued May 16, 1961, to Edward Rolle, there is disclosed a binder which is a mixture of two unsaturated polyester resins having styrene as a reactive monomer. Presently, many flare compositions which are used by the military have a polyester resin for a binder, however these resins have some disadvantages, particularly during processing. For example, many polyester resins have a very short pot life which makes the processing time very critical.

SUMMARY OF THE INVENTION

The present invention relates to an illuminating flare which is comprised of magnesium, sodium nitrate and a binder which is a mixture of an epoxy resin and a perchlorate-modified amine-terminated long chain polyglycol. The preferred binder mixture is 38 percent epoxy resin and 62 percent polyglycol resin.

Illuminating flares can be made according to the teachings of the present invention by either a mix and press process, a molding process, or by a casting process. In the former process the binder ingredients are pre-blended and then this mixture is added to the magnesium fuel. After again mixing, sodium nitrate is added and the mixture is blended until a relatively homogeneous mix is obtained. In this process, about two to eight percent of binder mix is combined with 92–98 percent of magnesium-sodium nitrate. The mixture is then added in increments to a candle container and consolidated by pressing.

In the molding or casting process the ingredients are blended the same as in the mix and press process except that the percentage of binder mix is much greater. As the binder mix is a liquid before polymerization takes place, a larger amount of binder mix will make the mixture rather fluid so that it can be readily poured in a mold or container.

It is therefore a general object of the present invention to provide an improved binder for an illuminating flare.

Other objects and advantages of the present invention will be readily appreciated as the same becomes better understood by reference to the following detailed description.

DESCRIPTION OF THE PREFERRED EMBODIMENT

The illuminating flares of the present invention are comprised essentially of a mixture of between 42 and 62 percent magnesium, between 28 and 40 percent sodium nitrate, and between 2 and 18 percent of a binder mix comprised of an epoxy resin and perchlorate-modified amine-terminated long chain polyglycol. The preferred binder mixture is 38 percent epoxy resin and 62 percent polyglycol resin.

After the illuminating flares are formed, the epoxy-polyglycol resin binder requires heat and time to polymerize. As the polymerization takes place, the binder mixture forms a tough, rubbery mass which holds the solid ingredients together. By way of example, polymerization, or curing, is accomplished by placing the candles in an oven for 24 hours at a temperature of 160 degrees F. A higher temperature will shorten the curing time and a lower temperature will lengthen the time for curing. After polymerization, the resulting candle is a firm, rigid mass.

The following are examples of compositions according to the present invention.

Example 1

| | Percent |
|---|---|
| Magnesium (granulation 18) | 62.0 |
| Sodium nitrate (20 microns) | 35.0 |
| Polyglycol resin (QX–3812) | 1.86 |
| Epoxy resin (D.E.R.–732) | 1.14 |

The magnesium particles were of granulation 18, as defined in Mil-Spec JAN–M–382, entitled, "Magnesium Powder for Use in Ammunition." The polyglycol and epoxy resins were obtained from The Dow Chemical Company, Midland, Mich. The epoxy resin used is marketed by The Dow Chemical Company under the trademark D.E.R. 732 and is a flexible epoxy resin. The polyglycol resin is a perchlorate-modified amine-terminated long chain polyglycol and The Dow Chemical Company designates the resin as QX–3812. This polyglycol resin is an amber liquid having a specific gravity of 1.05 at 25° C. and has the following analysis:

| | |
|---|---|
| Carbon | 59.10 |
| Hydrogen | 10.20 |
| Oxygen | 28.05 |
| Chlorine | 1.36 |
| Nitrogen | 1.29 |

The epoxy and polyglycol resins were first pre-blended and then mixed with the magnesium. This mixture was then blended and then the sodium nitrate was added and the mixture was blended until a homogeneous mix was obtained. The mixture was then put into a container and pressed at 5520 p.s.i. to form a candle 4.25 inches in diameter. The weight of the candle was 6624 g. The candle was cured for 24 hours at a temperature of 70 degrees C., and after curing the candle was burned with the following results:

| | |
|---|---|
| Burning time, secs | 169 |
| Burning rate, g/sec | 39.2 |
| Candlepower | $1.60 \times 10^6$ |

Example 2

| | Percent |
|---|---|
| Magnesium (granulation 18) | 62.0 |
| Sodium nitrate (20 microns) | 34.0 |
| Polyglycol resin (QX–3812) | 2.48 |
| Epoxy resin (D.E.R.–732) | 1.52 |

The ingredients were blended as in Example 1 and then pressed at 8450 p.s.i. to form a candle 4.25 inches in diameter. The weight of the candle was 7258 g. The candle was cured for 72 hours at a temperature of 80 degrees C., and after curing the candle was burned with the following results:

| | |
|---|---|
| Burning time, secs. | 195 |
| Burning rate, g./sec. | 33.0 |
| Candlepower | $1.74 \times 10^6$ |

Example 3

| | Percent |
|---|---|
| Magnesium (granulation 18) | 58.0 |
| Sodium nitrate (20 microns) | 37.5 |
| Polyglycol resin (QX–3812) | 2.79 |
| Epoxy resin (D.E.R.–732) | 1.71 |

The ingredients were blended as in Example 1 and then pressed at 8450 p.s.i. to form a candle 4.25 inches in diameter. The weight of the candle was 6800 g. The candle was cured for 72 hours at 80 degrees C., and after curing the candle was burned with the following results:

| | |
|---|---|
| Burning time, secs. | 267 |
| Burning rate, g./sec. | 25.4 |
| Candlepower | $1.17 \times 10^6$ |

Example 4

| | Percent |
|---|---|
| Magnesium (granulation 18) | 60.0 |
| Sodium nitrate (20 microns) | 34.0 |
| Polyglycol resin (QX–3812) | 3.72 |
| Epoxy resin (D.E.R.–732) | 2.28 |

The ingredients were blended as in Example 1 and then pressed at 3000 p.s.i. to form a candle 4.25 inches in diameter. The weight of the candle was 6443 g. The candle was cured for 72 hours at a temperature of 80 degrees C., and after curing the candle was burned with the following results:

| | |
|---|---|
| Burning time, secs. | 282 |
| Burning rate, g./sec. | 22.7 |
| Candlepower | $0.94 \times 10^6$ |

Example 5

| | Percent |
|---|---|
| Magnesium (granulation 18) | 57.0 |
| Sodium nitrate (20 microns) | 37.0 |
| Polyglycol resin (QX–3812) | 3.72 |
| Epoxy resin (D.E.R.–732) | 2.28 |

The ingredients were blended as in Example 1 and then pressed at 5220 p.s.i. to form a candle 4.25 inches in diameter. The weight of the candle was 6624 g. The candle was cured for 72 hours at a temperature of 80 degrees C., and after curing the candle was burned with the following results:

| | |
|---|---|
| Burning time, secs. | 293 |
| Burning rate, g./sec. | 22.6 |
| Candlepower | $0.91 \times 10^6$ |

Example 6

| | Percent |
|---|---|
| Magnesium (granulation 15) | 56.0 |
| Sodium nitrate (150 microns) | 31.2 |
| Polyglycol resin (QX–3812) | 7.94 |
| Epoxy resin (D.E.R.–732) | 4.86 |

The ingredients were blended as in Example 1 and then poured into a container to cast a candle 16 inches in diameter. The weight of the candle was 56,750 g. The candle was cured for 72 hours at a temperature of 80 degrees C., and after curing the candle was burned with the following results:

| | |
|---|---|
| Burning time, secs. | 242 |
| Burning rate, g./sec. | 234 |
| Candlepower | $0.99 \times 10^6$ |

The epoxy-polyglycol resin binder of the present invention have several important advantages over heretofore used polyester binders which are used in many military type flares. Candles having epoxy-polyglycol resin binder need not be subject to high pressures, as do candles having polyester type binders. For example, during tests made at the U.S. Naval Ammunition Depot, Crane, Ind., on flares having polyester binders, it was determined that by reducing the pressing pressure from 8450 p.s.i. to 5220 p.s.i., there was a corresponding reduction of efficiency from 40,000 cd.-sec./g. to about 32,000 cd.-sec./g. This degradation is sufficiently large that the reduced pressing pressures could not be used. Tests, however, on candles utilizing an epoxy-polyglycol resin binder showed that pressing pressures of 2200 p.s.i., 3000 p.s.i., 5220 p.s.i., and 8450 p.s.i., resulted in candles all of which had an efficiency of over 40,000 cd.-sec./g.

Another feature of an epoxy-polyglycol resin binder is its slow burning property. In tests conducted at the U.S. Naval Ammunition Depot, Crane, Ind., candles having an epoxy-polyglycol binder had a consumption rate of about 25 grams per second whereas the same size candles having a polyester binder had a consumption rate of about 38 grams per second. The overall efficiency of the two types of candles was the same. This slow burning property of candles having an epoxy-polyglycol binder is unique and is of considerable advantage for designing long burning flares.

Candles made with the epoxy-polyglycol binder require an elevated temperature cure which has some advantages. For one thing, polymerization takes place after all the ingredients have been added and better bonding results. Also the binder has a long pot life at room temperature which makes it easier to process the candles as there is no danger of setting up in the mixer or during handling.

Obviously many modifications and variations of the present invention are possible in the light of the above teachings. It is therefore to be understood, that within the scope of the appended claim, the invention may be practiced otherwise than as specifically described.

I claim:
1. An illuminating flare composition comprised of between 42 and 62 percent by weight, of magnesium, between 28 and 40 percent, by weight, of sodium nitrate, and between 2 and 18 percent, by weight, of a binder composed of about 38 percent, by weight, of epoxy resin and about 62 percent, by weight, of polyglycol resin said polyglycol resin being composed, by weight, of about 59.10 percent carbon, about 28.05 percent oxygen, about 10.20 percent hydrogen, about 1.36 percent chlorine, and about 1.29 percent nitrogen.

References Cited

UNITED STATES PATENTS

| | | | |
|---|---|---|---|
| 3,162,558 | 12/1964 | Bishop et al. | 149—44 X |
| 3,258,373 | 6/1966 | Douda | 149—44 X |
| 3,261,731 | 7/1966 | Lopatin et al. | 149—44 X |
| 3,309,249 | 3/1967 | Allen | 149—44 X |

CARL D. QUARFORTH, *Primary Examiner.*

S. J. LECHERT, Jr., *Assistant Examiner.*